Feb. 26, 1929.  E. F. KAHLERT ET AL  1,703,489
SAFETY REFLECTOR FOR MOTOR VEHICLES
Filed March 1, 1928

Inventor
E.F. KAHLERT
S.F. STEUART

By  *Ch. H. Harbra*
Attorney

Patented Feb. 26, 1929.

1,703,489

UNITED STATES PATENT OFFICE.

ERNEST F. KAHLERT AND STANLEY F. STEUART, OF BROWERVILLE, MINNESOTA.

SAFETY REFLECTOR FOR MOTOR VEHICLES.

Application filed March 1, 1928. Serial No. 258,297.

This invention relates to safety reflectors for motor vehicles and the like.

One of the objects of our invention is the provision of a hub cap for the wheels of motor vehicles, having a plurality of reflecting glasses mounted thereon, adapted to reflect the rays of lights from approaching motor vehicles, whereby the driver of an approaching vehicle may safely determine what course to pursue when passing a vehicle equipped with the safety reflector.

It is usually customary with the manufacturers of motor vehicles to inscribe the name of each car on the outer end of the hub caps on the wheels of each car. Another object of this invention is to provide a hub cap having a plurality of reflecting glasses mounted thereon so as not to obscure the above mentioned inscription.

A further object is to provide a device of the type above mentioned wherein the reflecting glasses may be readily removed for the purpose of cleaning or replacing the same.

Other objects and advantages of our invention will become apparent from the following description.

In the drawings we have shown one embodiment of the invention. In this showing:

Figure 1:
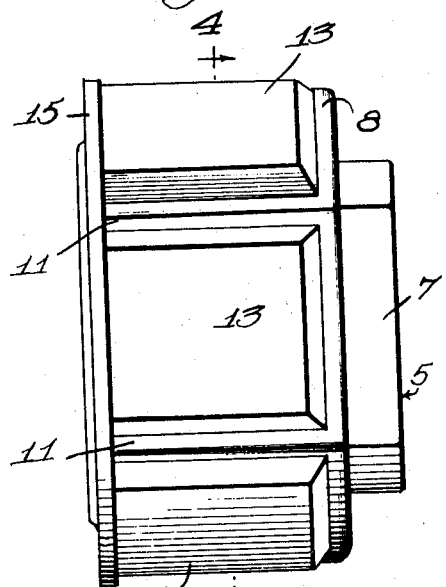
Figure 1 is a side elevation of our improved safety reflector.
Figure 2:
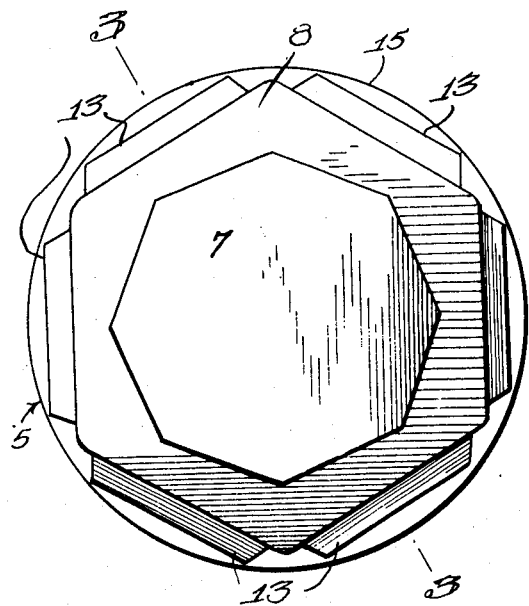
Figure 2 is an end elevation thereof.
Figure 3:
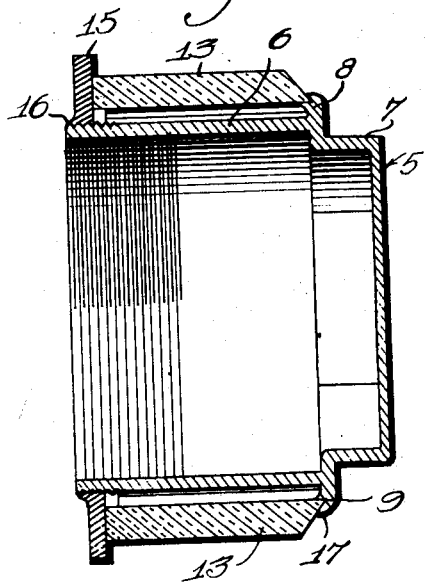
Figure 3 is a sectional view taken substantially on the line 3—3 of Figure 2.
Figure 4:
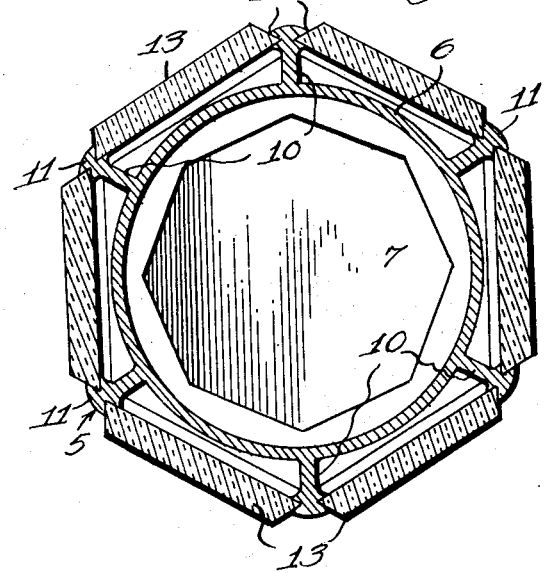
Figure 4 is a sectional view taken substantially on the line 4—4 of Figure 1.

Referring to the drawings, the numeral 5 designates as a whole, a hub cap of the cup-shaped type, the open end of which is adapted to be secured to the hub of the wheels of a motor vehicle in the usual or any desired manner. The hub cap 5 is provided with a body portion 6 and a reduced end portion 7. The body 6 is preferably shaped cylindrically and adjacent its reduced end portion, is provided with a preferably integral radially extending peripheral flange 8 terminating in an enlarged end portion 17, and having a plurality of spaced, substantially V-shaped grooves 9 in its enlarged end portion. A plurality of preferably integral radial ribs 10 having enlarged end portions 11 extend outwardly from the member 6 and each enlarged end portion 11 is provided on both sides thereof with a longitudinal substantially V-shaped groove 12. The outer ends of the grooves 12 are adapted to meet the ends of the groves 9, whereby a plurality of substantially rectangular grooved openings are provided between the ribs 10 and the flange 8.

Slidably mounted in the grooves 12 are a plurality of rectangular glass facets 13 provided with a silvered or otherwise light reflecting backing, having their outer and side edges bevelled, the outer ends being adapted to seat within the grooves 9. The inner ends of the facets are substantially vertical and an enlarged ring or retaining member 15 is adapted to abut against the vertical inner ends. The ring 15 is provided with internal threads and is adapted to be threaded on the externally threaded inner end portion of the member 6 substantially as shown at 16, whereby the members 13 are positively held in their grooved seats against accidental displacement. The reduced end portion 7 is preferably shaped octagonally and is adapted to receive a wrench or similar tool when the hub cap is being threaded on the hub of a wheel.

The construction described provides a substantially hexagonal hub cap which, when rotating on the hub of a vehicle wheel, will successively present the facets 13 to the rays of the lights of an approaching vehicle, and the reflection therefrom will serve as a warning to the driver of the approaching vehicle. It is to be understood however that our invention is not limited to a hexagonally shaped device and any desired shape may be utilized.

The simplicity and practicability of our improved safety reflector is believed to be apparent. The glass members may be removed from their seats by removing the ring 15 and may be cleaned or replaced with ease. The device is inexpensive to manufacture and provides a serviceable hub cap, having glass reflectors thereon, which can be colored in the usual traffic colors, red, green and amber. It is also possible to use the device as a novelty and if such use is contemplated, the glass could be any desired color.

It is to be understood that the form of our invention herewith shown and described is to be taken as a preferred example of the same and that various changes in the shape, size and arrangement of parts may be resorted to without departing from the spirit of the invention or the scope of the subjoined claims.

We claim:

1. In a hub cap having a peripheral flanged portion extending therefrom and provided with a plurality of spaced grooves in said flanged portion, a plurality of grooved longitudinal ribs extending radially from said cap, a plurality of reflecting members adapted to seat within the grooves in said flange and said ribs, and a common means for retaining said members in their respective seats.

2. In a hub cap having a peripheral flanged portion extending therefrom and provided with a plurality of spaced grooves in said flanged portion, a plurality of grooved longitudinal ribs extending radially from said cap, a plurality of reflecting glasses slidably mounted within the grooves in said flange and said ribs, and a common means for retaining said glasses in their respective grooves.

3. In a hub cap having a peripheral flanged portion extending therefrom and provided with a plurality of spaced grooves in said flanged portion, a plurality of grooved longitudinal ribs extending radially from said cap, a plurality of reflecting members adapted to seat within the grooves in said flange and said ribs, and a common means for retaining said reflecting members in their respective seats, comprising an annular member mounted on said cap and adapted to abut against said glass members.

4. In a hub cap having a peripheral flanged portion extending therefrom and provided with a plurality of spaced grooves in said flanged portion, a plurality of grooved longitudinal ribs extending radially from said cap, a plurality of reflecting glasses slidably mounted within the grooves in said flange and said ribs, and a common means for retaining said glasses in their respective grooves, comprising an annular member mounted on said cap and adapted to abut against said glass members.

5. The combination with a hub cap, of a reflecting member removably secured in the outer periphery thereof, said cap having integral portions partially engaging said reflecting member, and an annular member mounted on said cap and adapted to abut against one extremity of said reflecting member whereby said reflecting member is held against accidental displacement.

In testimony whereof we affix our signatures.

ERNEST F. KAHLERT.
STANLEY F. STEUART.